United States Patent [19]

Sumida

[11] Patent Number: 5,640,260
[45] Date of Patent: Jun. 17, 1997

[54] LIQUID CRYSTAL LIGHT VALVE HAVING A EOPT OF LESS THAN 0.5 EV

[75] Inventor: Yukihiro Sumida, Nara, Japan

[73] Assignee: Sharp Kabushiki Kaisha, Osaka, Japan

[21] Appl. No.: 507,703

[22] Filed: Jul. 26, 1995

[30] Foreign Application Priority Data

Aug. 25, 1994 [JP] Japan .................................. 6-200595

[51] Int. Cl.$^6$ .................................................. G02F 1/135
[52] U.S. Cl. ................................................ 349/26; 349/29
[58] Field of Search ........................................ 359/72, 67

[56] References Cited

U.S. PATENT DOCUMENTS

| | | | |
|---|---|---|---|
| 4,019,807 | 4/1977 | Boswell | 350/160 |
| 4,609,771 | 9/1986 | Guha et al. | 257/53 |
| 4,775,425 | 10/1988 | Guha et al. | 257/55 |
| 4,799,773 | 1/1989 | Sterling | 350/342 |
| 4,891,330 | 1/1990 | Guha et al. | 437/81 |
| 5,084,777 | 1/1992 | Slobodin | 359/67 |
| 5,467,204 | 11/1995 | Hatano et al. | 359/42 |

OTHER PUBLICATIONS

"Preparation and Characterization of a–SiGEC:H Light Absorption Layers for Liquid Crystal Spatial Light Modulators", J. Kondo, et al. 40th Lecture by Applied Physics Association, Spring 1993, No. 29p–ZD–1.

*Primary Examiner*—William L. Sikes
*Assistant Examiner*—James A. Dudek
*Attorney, Agent, or Firm*—David G. Conlin; George W. Neuner

[57] ABSTRACT

A liquid crystal light valve includes a light transmitting substrate where a transparent electrode, a photoconductor layer and a light blocking layer have been formed, a light transmitting substrate which is opposite to the above light transmitting substrate and on which a counter electrode has been formed, and a liquid crystal layer formed by sealing liquid crystal between these light transmitting substrates. The light blocking layer is composed of 4B group alloy mainly containing silicon, such as hydrogenated amorphous silicon germanium or hydrogenated amorphous silicon tin, and it is formed so that a relationship between activation energy Ea and an optical gap Eopt becomes 0<Ea<Eopt/2 or 0<Ea≦0.50 eV. As a result, the light blocking layer with gentle temperature properties and high resistance can be obtained. Therefore, it is possible to provide the light blocking layer where a change in conductivity according to a change in temperature is small. Therefore, since the temperature properties with respect to the conductivity of the light blocking layer can be relieved, it is possible to provide a liquid crystal light valve having high brightness and high resolution without deteriorating light blocking properties.

18 Claims, 14 Drawing Sheets

LIQUID CRYSTAL LIGHT VALVE HAVING A EOPT OF LESS THAN 0.5 EV

FIELD OF THE INVENTION

The present invention relates to a photoaddressed liquid crystal light valve which is applied to a projection-type liquid crystal display apparatus, an optical computing device, a wavelength converter, etc.

BACKGROUND OF THE INVENTION

In recent years, large-screen projection-type displays have been enthusiastically developed for the purpose of seeing videotapes at home and of presentation. As a conventional large-screen display, a projector equipped with a TFT (Thin Film Transistor) liquid crystal panel or a CRT (Cathode Ray Tube) is used, and for presentation, a slide projector and an overhead projector are used. However, since they provide very dark brightness of screens, in the case where the above-mentioned projectors are used, it is necessary to darken a room. Therefore, the above-mentioned projectors are unsuitable for seeing videotapes in a light room or for taking notes while presentation.

Therefore, in order to improve brightness of a screen, a liquid crystal light valve is used in the above-mentioned projectors. For example, U.S. Pat. No. 4,019,807 issued 1977 by Boswell et al. describes a photoaddressed liquid crystal light valve which uses cadmium sulfide (CdS) as a photoconductor layer, cadmium telluride (CdTe) as a light blocking layer, MgF/ZnS which is a dielectric multilayer as a light reflecting layer. However, since the CdS is used for the photoconductor layer, a responding speed of an element is slow and reproducibility is inferior. Therefore, U.S. Pat. No. 4,799,773 issued 1989 by Sterling describes a photoaddressed liquid crystal light valve which uses hydrogenated amorphous silicon (a-Si:H) providing a high responding speed of an element and excellent reproducibility as a photoconductor layer, CdTe as a light blocking layer, and $SiO_2/TiO_2$, which is a dielectric multilayer as a light reflecting layer. However, this liquid crystal light valve has problems that the CdTe as the light blocking layer does not adhere well to the hydrogenated amorphous silicon as the photoconductor layer, and that light blocking properties of the CdTe are not sufficient.

Therefore, for example, a reference 1 (U.S. Pat. No. 5,084,777 by David E. Slobodin Greyhawk Systems, Inc.) discloses a photoaddressed liquid crystal light valve whose purpose is a display of high brightness which uses hydrogenated amorphous silicon (a-Si:H) as a photoconductor layer, hydrogenated amorphous silicon germanium (a-SiGe:H) providing excellent adhesion to the photoconductor layer and excellent light blocking properties as a light blocking layer.

As shown in FIG. 10, for example, the liquid crystal light valve of the reference 1 is composed of a liquid crystal layer 107, a light reflecting layer 104, a light blocking layer 103 and a photoconductor layer 102, and has a sandwich construction such that each layer is put between light transmitting substrates 100a.100b made of glass, etc. where transparent electrically conductive films 101a.101b have been formed. The liquid crystal layer 107 modulates intensity of a read light 110 according to a change in a voltage to be applied. The light reflecting layer 104 is composed of a dielectric multilayer film which reflects the read light 110. The light blocking layer 103 is composed of hydrogenated amorphous silicon germanium which blocks a transmitted light from the light reflecting layer 104. The impedance of the photoconductor layer 102 changes according to intensity of writing light 109, and is composed of hydrogenated amorphous silicon which controls the voltage applied to the liquid crystal layer 107.

In addition, the liquid crystal layer 107 is formed such that liquid crystal is sealed in a gap which is formed by providing spacers 106.106 between alignment films 105a.105b. The alignment film 105a formed on the light reflecting layer 104 and the alignment film 105b formed on the transparent electrically conductive film 101b align liquid crystal molecules. Moreover, The transparent electrically conductive films 101a.101b are connected to a driving power source 111 which generates an alternating voltage.

In the above liquid crystal light valve, when an image signal is not inputted to the photoconductor layer 102 by the writing light 109 (in a dark state), the photoconductor layer 102 has high impedance, but when the image signal is inputted to the photoconductor layer 102 by the writing light 109 (in a light state), the photoconductor layer 102 has low impedance due to a photoconductive effect. As a result, the voltage to be applied to the liquid crystal layer 107 exceeds a threshold voltage, and an alignment state of the liquid crystal layer 107 is changed. A reflected light of the reading light 110, in which intensity changes according to the alignment state, is projected on a screen through a polarizing beam splitter, etc. so as to be taken out as an image signal.

In addition, a projection-type liquid crystal display apparatus which uses a liquid crystal light valve has an arrangement shown in FIG. 11. In this projection-type liquid crystal display apparatus, an image which has been formed by a CRT 122 is written to a liquid crystal light valve 123 by a fiber plate, etc., whereas the reading light 110 emitted from a reading light source 121 enters the liquid crystal light valve 123 through an optical lens 125a and a polarizing beam splitter 124. After the reading light 110 is modulated in the liquid crystal light valve 123 according to the image, the reading light 110 passes through the polarizing beam splitter 124 and an optical lens 125b so that its image is projected on a screen 126.

Incidentally, in next-generation media represented by hi-definition television, its brightness and its resolution have been developed higher, and accordingly, in the projection-type liquid crystal display apparatus, its brightness and resolution have been developed higher.

For this reason, in order to improve the brightness of the projection-type liquid crystal display apparatus higher, it is necessary to develop brightness of the reading light source 121, so it is necessary to increase output of the lamp. In this case, since a temperature of a whole system of the projection-type liquid crystal display apparatus rises, a temperature of the liquid crystal light valve also rises to 40° C.–60° C.

In the reference 1, a relationship among electric conductivity (hereinafter, referred to as conductivity), light blocking properties and a temperature of the light blocking layer is represented by a formula (1), and the conductivity is optimized by using Eopt in a range of 1.0<Eopt<1.5.

$$\sigma = \sigma_0 \exp(-Eopt/2kT) \qquad (1)$$

σ: conductivity (S/cm)
Eopt: optical gap (eV)
k: Boltzmann's constant $8.62 \times 10^{-5}$ (eV/K)
T: temperature (K)

However, in general, as is clear from FIG. 14 and the formula (1), as to an amorphous semiconductor thin film, even when the Eopt is optimized, its conductivity rises due to a rise in temperature, so its resistivity is lowered according to the rise in temperature. For this reason, in the case where a photoaddressed liquid crystal light valve is produced by using a light blocking layer having a condition of 1.0<Eopt<1.5 mentioned in the reference 1, there arises a problem that the resolution is lowered because as shown in FIG. 12, the temperature rises, as time passes.

In addition, a reference 2 (Abstracts of one lecture of the 40th lecture meeting held by Applied Physics association, Spring 1993, No. 29p-ZD-1 "Preparation and Characterization of a-SiGeC:H Light Absorption Layers for Liquid Crystal Spatial Light Modulators, NGK INSULATORS, LTD., Science & Technical Res. Lab., NHK) describes a photoaddressed liquid crystal light valve which uses BSO as a photoconductor layer and hydrogenated amorphous silicon germanium carbon (a-SiGeC:H) as a light blocking layer. However, the reference 2 does not describe that temperature properties were improved according to a relationship between conductivity and temperature of the light blocking layer.

Therefore, it is necessary to provide the light blocking layer where sufficient light blocking properties are given by relieving the temperature properties of resistivity of amorphous semiconductor and by repressing a drop in the resolution of the liquid crystal light valve as small as possible also under high temperature.

In addition, the temperature properties of the light blocking layer will be described based upon a formula (2) by using activation energy Ea of the light blocking layer. Here, the formula (2) shows a generally relational formula between the conductivity and the activation energy.

$$\sigma = \sigma_0 \exp(-Ea/kT) \quad (2)$$

$\sigma$: conductivity (S/cm)
Ea: activation energy (eV)
k: Boltzmann's constant $8.62 \times 10^{-5}$ (eV/K)
T: temperature (K)

As mentioned above, as shown in FIG. 13, the lowering of the resolution of the liquid crystal light valve is caused by a rise in the conductivity of the light blocking layer due to the rise in temperature.

In addition, as is clear from the formula (2), the rise in the conductivity due to the rise in temperature is represented by the activation energy Ea. Ideally, when Ea =0 eV, the conductivity has no temperature properties, but it is not practical.

In addition, the reference 1 specifies a relationship between the optical gap Eopt and activation energy Ea as Ea≅Eopt/2. According to this relationship, the relationship between the optical gap Eopt and the activation energy Ea is 1:1, so for example, when Eopt=1.1 eV, Ea=0.55 eV, and when Eopt=1.3 ev, Ea=0.65 eV. Therefore, the larger the Eopt is, the larger Ea becomes, in other words, the larger the Eopt is, the higher conductivity rises according to the rise in temperature, thereby lowering the resolution remarkably.

SUMMARY OF THE INVENTION

It is an object of the present invention to provide a liquid crystal light valve with high brightness and high resolution.

In order to attain the above object, a liquid crystal light valve of the present invention is formed so as to include a pair of transparent substrates having electrodes, a photoconductor layer and a light blocking layer which are formed on one of the electrodes of the transparent substrates, and liquid crystal which is sealed between the pair of transparent substrates, and so that the light blocking layer is composed of 4B group alloy mainly containing silicon and a relationship between its activation energy Ea and its optical gap Eopt becomes 0<Ea<Eopt/2 or 0<Ea≦0.50 eV.

The light blocking layer of the liquid crystal light valve is composed of the 4B group alloy mainly containing silicon, such as hydrogenated amorphous silicon germanium, hydrogenated amorphous silicon tin. Furthermore, since the light blocking layer is formed so that the relationship between its activation energy Ea and its optical gap Eopt becomes 0<Ea<Eopt/2 or 0<Ea<0.50 eV, the light blocking layer with gentle temperature properties and high resistance can be obtained.

Therefore, it is possible to provide the light blocking layer in which a change in conductivity according to a change in temperature is small, and accordingly, the temperature properties to resistivity of the light blocking layer can be relieved, so it is possible to provide the liquid crystal light valve with high brightness and high resolution without deteriorating light blocking properties.

For fuller understanding of the nature and advantages of the invention, reference should be made to the ensuing detailed description taken in conjunction with the accompanying drawings.

DESCRIPTION OF THE EMBODIMENTS

[EMBODIMENT 1]

Figure 1:
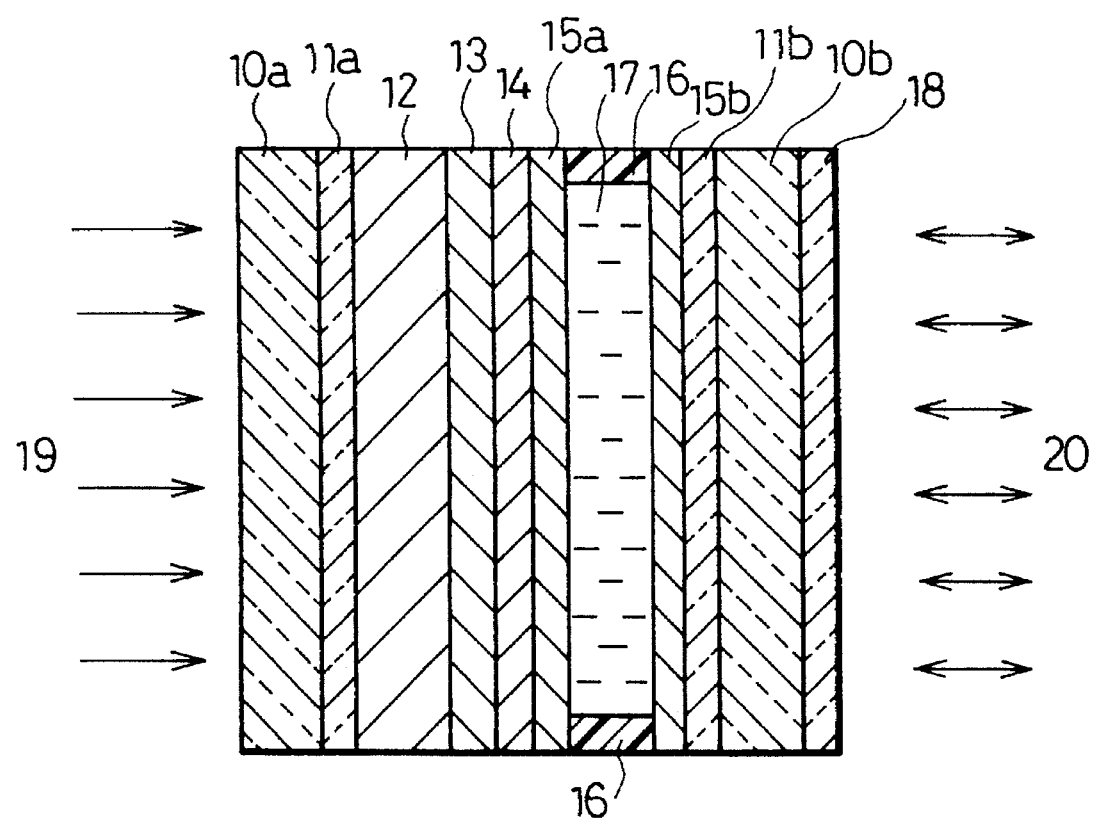
FIG. 1 is a schematically constitutional cross section of a liquid crystal light valve of one embodiment according to the present invention.
Figure 2:
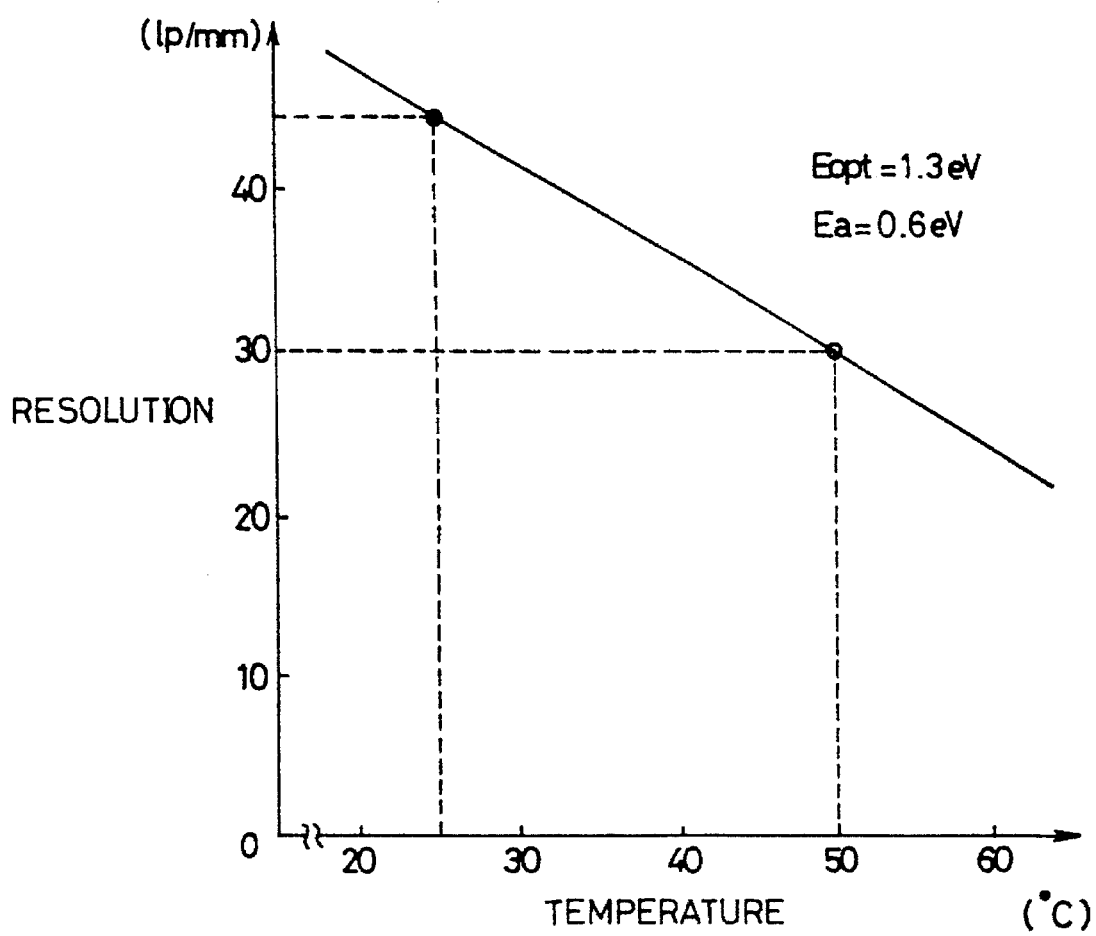
FIG. 2 is a graph which shows a relationship between a change in temperature and resolution of the liquid crystal light valve shown in FIG. 1.
Figure 3:
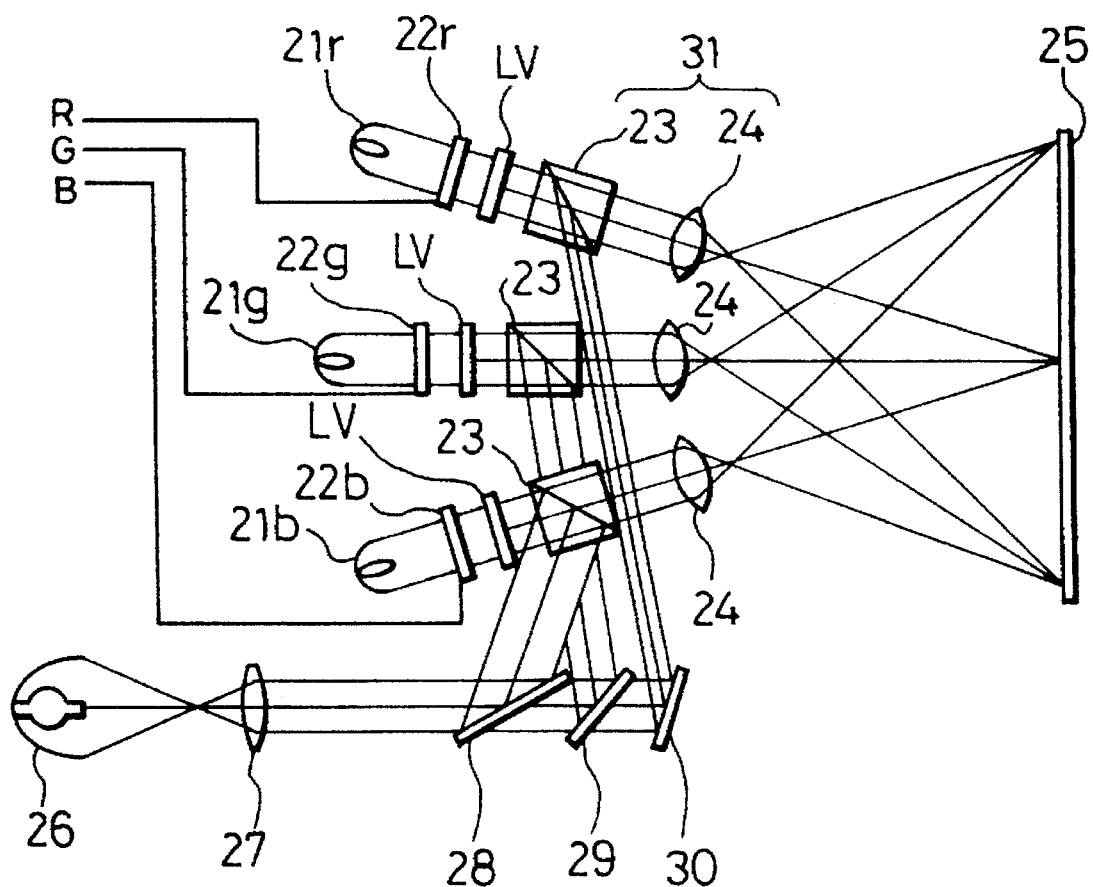
FIG. 3 is a schematically constitutional drawing of a projection system which uses the liquid crystal light valve shown in FIG. 1.

The following will discuss one embodiment of the present invention referring to FIGS. 1 through 3.

As shown in FIG. 1, a liquid crystal light valve of the present embodiment is composed of a liquid crystal layer 17, a dielectric mirror (light reflecting layer) 14, a light blocking layer 13 and a photoconductor layer 12, and it has a sandwich structure such that each layer is put between light transmitting substrates 10a.10b made of glass on which a transparent electrode 11a and a counter electrode 11b have been formed. Moreover, an anti-reflection coating 18 for preventing reflection of a reading light 20 is formed on a surface of the reading light 20 side of the light transmitting substrate 10b.

The liquid crystal layer 17 modulates intensity of the reading light 20 according to a change in a voltage to be applied to the liquid crystal layer. The dielectric mirror 14 is composed of a dielectric multilayer film which reflects the reading light 20. The light blocking layer 13 is composed of hydrogenated amorphous silicon germanium which blocks a transmitted light from the dielectric mirror 14. The impedance of the photoconductor layer 12 changes according to intensity of a writing light 19 and is composed of hydrogenated amorphous silicon which controls a voltage to be applied to the liquid crystal layer 17.

In addition, an alignment film 15a which aligns liquid crystal molecules is formed on the dielectric mirror 14, whereas an alignment film 15b which aligns liquid crystal molecules is formed on the counter electrode 11b. The liquid crystal layer 17 is formed by sealing liquid crystal between the alignment films 15a.15b in a gap which is formed by providing spacers 16.16. Moreover, the transparent electrodes 11a.11b are connected to a driving power source (not shown) which generates an alternating voltage.

In the liquid crystal light valve, when an image signal is not inputted to the photoconductor layer 12 by the writing light 19 (in a dark state), the photoconductor layer 12 has high impedance. Meanwhile, in the liquid crystal light valve, when an image signal is inputted to the photoconductor layer 12 by the writing light 19 (in a light state), the photoconductor layer 12 has low impedance due to a photoconductive effect. Therefore, the voltage to be applied to the liquid crystal layer 17 exceeds a threshold voltage, and an alignment state of the liquid crystal molecules is changed. A reflected light of the reading light 20 whose intensity is changed according to the change in the alignment state is projected on a screen through a polarizing beam splitter, etc. so as to be taken out as an image signal.

Next, the following will discuss a method of producing the liquid crystal light valve.

First, a transparent electrically conductive film composed of indium oxide (ITO) which is wholly doped with tin is formed on the light transmitting substrate 10a by sputtering method, and it becomes the transparent electrode 11a.

Next, a hydrogenated amorphous silicon (a-Si:H) film is formed as the photoconductor layer 12 on the transparent electrode 11a by plasma CVD method (plasma-enhanced chemical vapor deposition method) which uses silane ($SiH_4$) gas as raw materials so that its film thickness becomes 7 μm.

Successively, hydrogenated amorphous silicon germanium (a-SiGe:H) is formed as the light blocking layer 13, which blocks a light entering the photoconductor layer 12 from the liquid crystal layer 17 side, on the photoconductor layer 12 by the plasma CVD method so that its thickness becomes approximately 1 μm.

The hydrogenated amorphous silicon germanium (a-SiGe:H) is created by using silane ($SiH_4$) gas, germane ($GeH_4$) gas and Argon (Ar) gas as raw materials. Creating conditions at this time are as follows. A gas ratio, $SiH_4:GeH_4:Ar=2:1:15$, pressure is 0.8 Torr, temperature of the substrate is 250° C. and Rf power is 60 W. An optical gap Eopt of the light blocking layer 13 which has been created in such a manner becomes 1.3 eV, and its activation energy Ea becomes 0.6 eV.

Thereafter, on the light blocking layer 13, a multilayer, which is composed of titanium oxide ($TiO_2$) and silicon oxide ($SiO_2$), is formed as the dielectric mirror 14 for reflecting a light entering from the liquid crystal layer 17 side to the photoconductor layer 12 by electron beam deposition method.

Next, the counter electrode 11b is formed on the liquid crystal layer 17 side on the light transmitting substrate 10b which is opposite to the light transmitting substrate 10a by depositing a transparent electrically conductive film composed of ITO by means of sputtering method, and the anti reflection coating 18 for preventing reflection from a surface of glass is also formed on an incident side of the reading light 20.

Successively, an alignment film is filmed by spin coating and is baked at 180° C. so that the alignment films 15a.15b with a film thickness of approximately 500 Å are formed on the counter electrode 11b and the dielectric mirror 14.

Thereafter, the alignment films 15a.15b are subject to an alignment process by means of rubbing. A rubbing direction is twisted 45°. A sealant composed of resin is printed on one substrate so that spacers 16.16 are formed, and the light transmitting substrate 10a and the light transmitting substrate 10b are stuck to each other through the spacers 16.16. In such a way, the liquid crystal light valve of the present invention is arranged.

Figure 12:
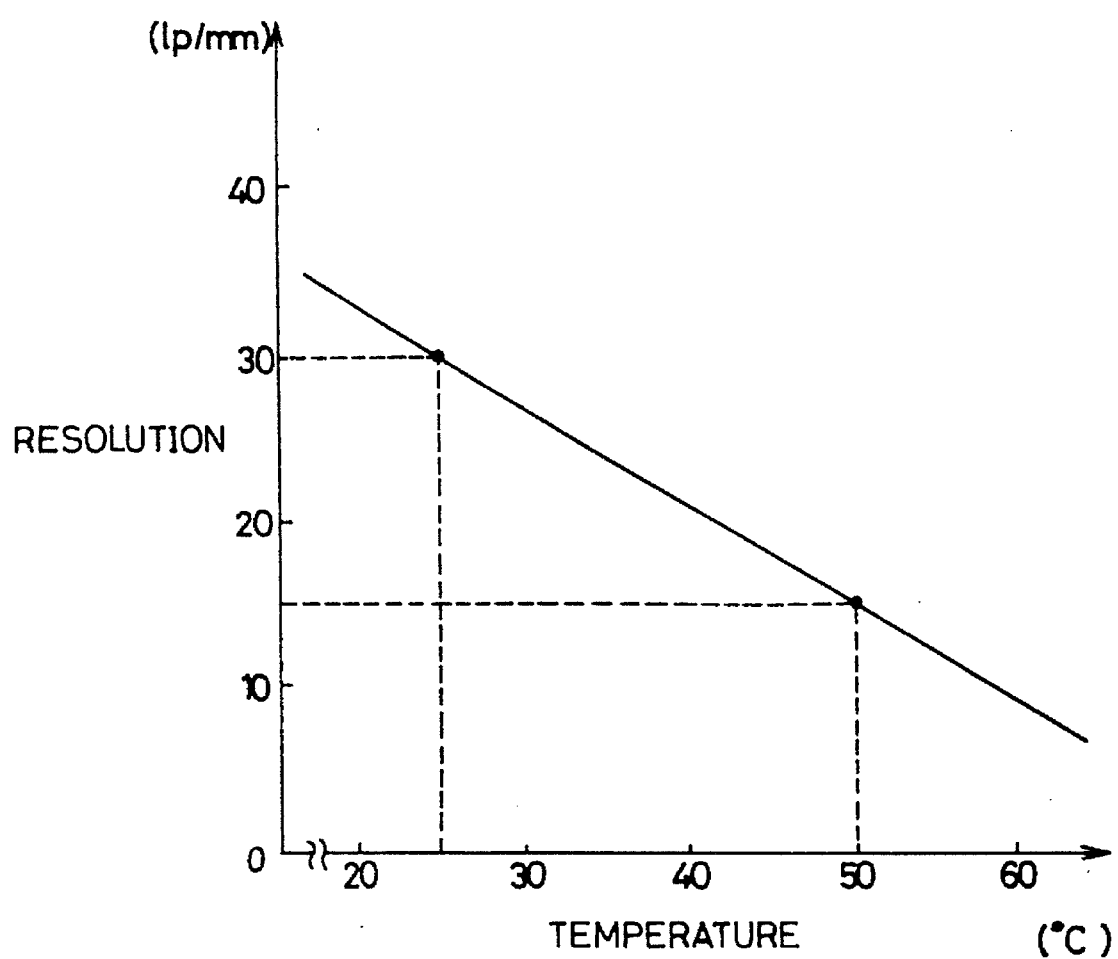
FIG. 12 is a graph which shows a relationship between a change in temperature and resolution of the liquid crystal light valve shown in FIG. 10.
Figure 13:
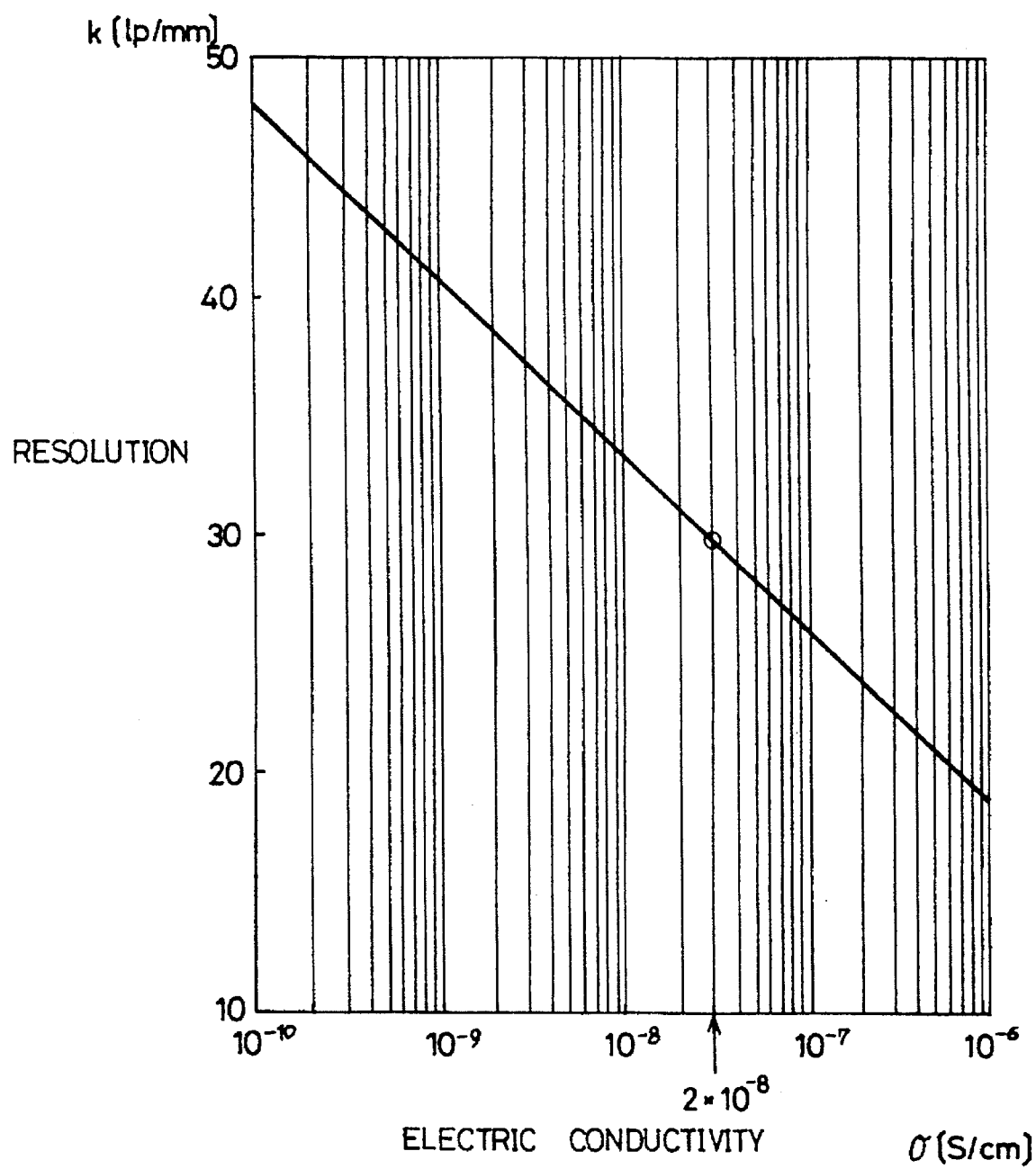
FIG. 13 is a graph which shows a relationship between a change in conductivity of a general light blocking layer and resolution of a general liquid crystal light valve.
Figure 14:
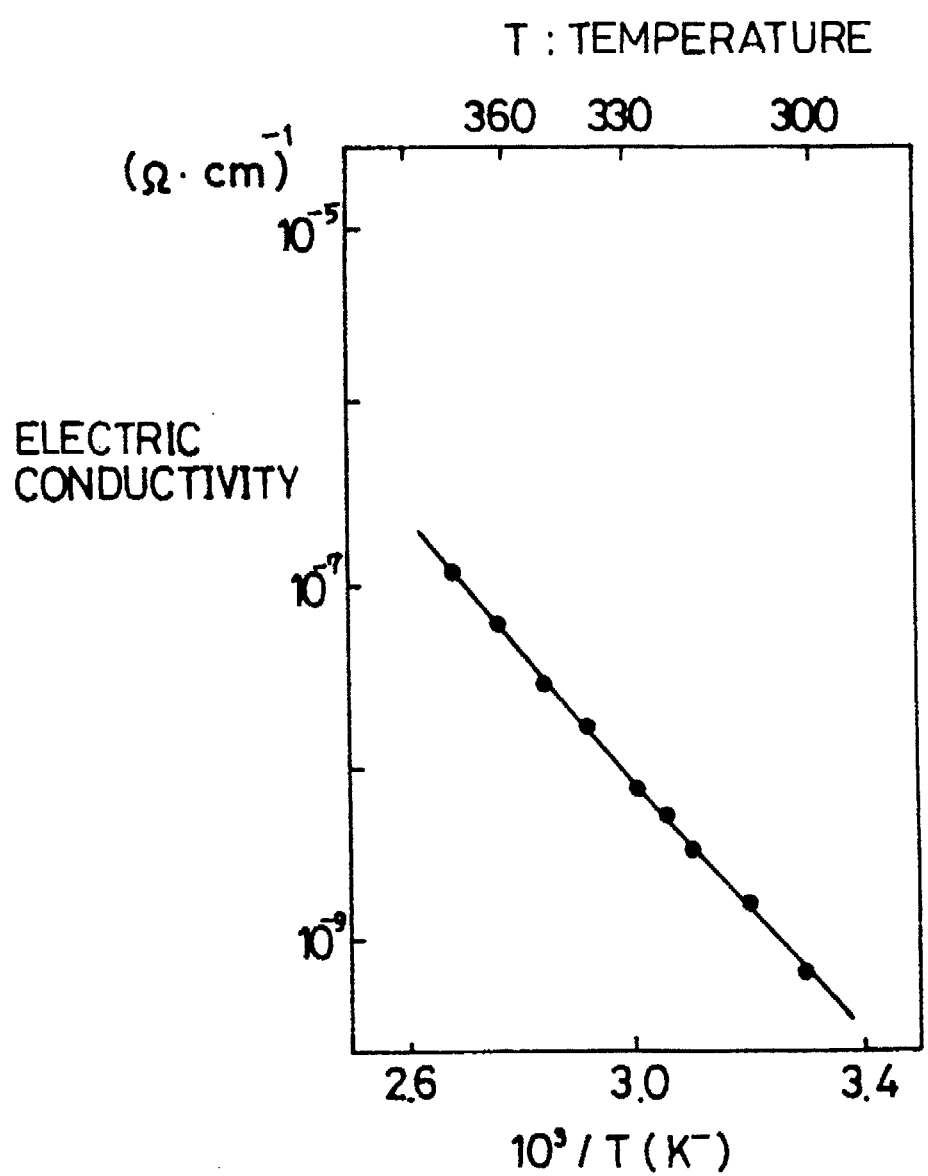
FIG. 14 is a graph which shows a relationship between conductivity and temperature of the liquid crystal light valve shown in FIG. 10.

Here, FIG. 2 shows a relationship between resolution and temperature of the liquid crystal light valve with the above arrangement. As is clear from FIG. 2, when the liquid crystal light valve of the present embodiment is compared with the liquid crystal light valve having a conventional light blocking layer 103, namely, when the relationship between resolution and temperature in FIG. 2 is compared with that in FIG. 12, in the case of the liquid crystal light valve of the present embodiment, a rate of a drop in the resolution due to a rise in the temperature is low. For example, as shown in FIG. 2, the resolution of the liquid crystal light valve of the present embodiment at 26° C. becomes approximately 43 (lp/mm), whereas as shown in FIG. 12, the resolution of the conventional liquid crystal light valve at 26° C. becomes approximately 30 (lp/mm). Moreover, as shown in FIG. 2, the resolution of the liquid crystal light valve of the present embodiment at 50° C. becomes approximately 30 (lp/mm), whereas as shown in FIG. 12, the resolution of the conventional liquid crystal light valve at 50° C. becomes approximately 15 (lp/mm). Therefore, in the liquid crystal light valve of the present embodiment, even when its temperature rises, higher resolution can be maintained than in the conventional liquid crystal light valve.

As a result, the lowering of resolution due to the rise in temperature is not remarkable, so it is found that the liquid crystal light valve has high brightness and high resolution. Moreover, the light blocking properties of the light blocking layer 13 are satisfactorily maintained without the drop due to the rise in temperature.

In addition, as shown in FIG. 3, a projection system as a projection-type liquid crystal display apparatus which is composed of the liquid crystal light valve with the above arrangement is arranged such that each liquid crystal light valve LV corresponds to write lamps 21r.21g.21b as writing light source for displaying red, green and blue images through TFT liquid crystal panels 22r.22g.22b as image generating means.

The TFT liquid crystal panels 22r.22g.22b form images according to each color signal (R.G.B), and as a result, the images which have been formed on the TFT liquid crystal panels are written into each liquid crystal light valve LV by light emitted from the write lamp 21r.21g.21b.

Meanwhile, the above projection system is provided with a read lamp 26 as a reading light source, and a light emitted from the read lamp 26 is sent to filters 28.29 and a mirror 30 through a lens system 27 so as to enter each polarizing beam splitter 23 which is provided for each color. The lights which passed the polarizing beam splitter 23 are individually modulated according to brightness of the writing light source by the liquid crystal light valve LV. The read images obtained by the above manner are synthesized and magnified so as to be projected on a screen 25 by an optical system 31 as projection means such as the polarizing beam splitter 23 and a lens system 24.

The images which have been projected by the projection system with the above arrangement has high resolution and high contrast, so they are excellent. Therefore, it is possible to provide a projection system, which can easily realize projected display with high brightness, high resolution and high contrast, by using the liquid crystal light valve with above arrangement.

[EMBODIMENT 2]

Figure 4:
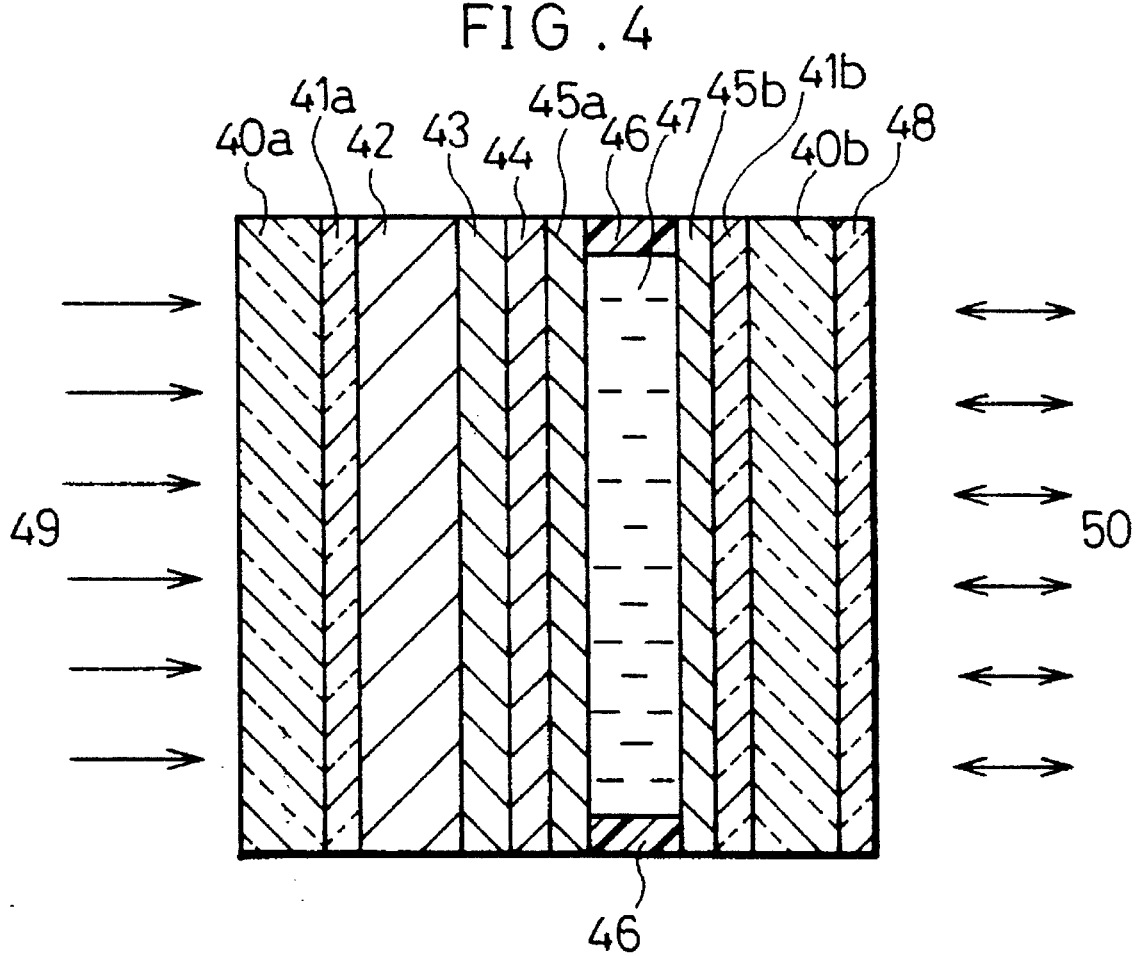
FIG. 4 is a schematically constitutional cross section of a liquid crystal light valve of another embodiment according to the present invention.
Figure 5:
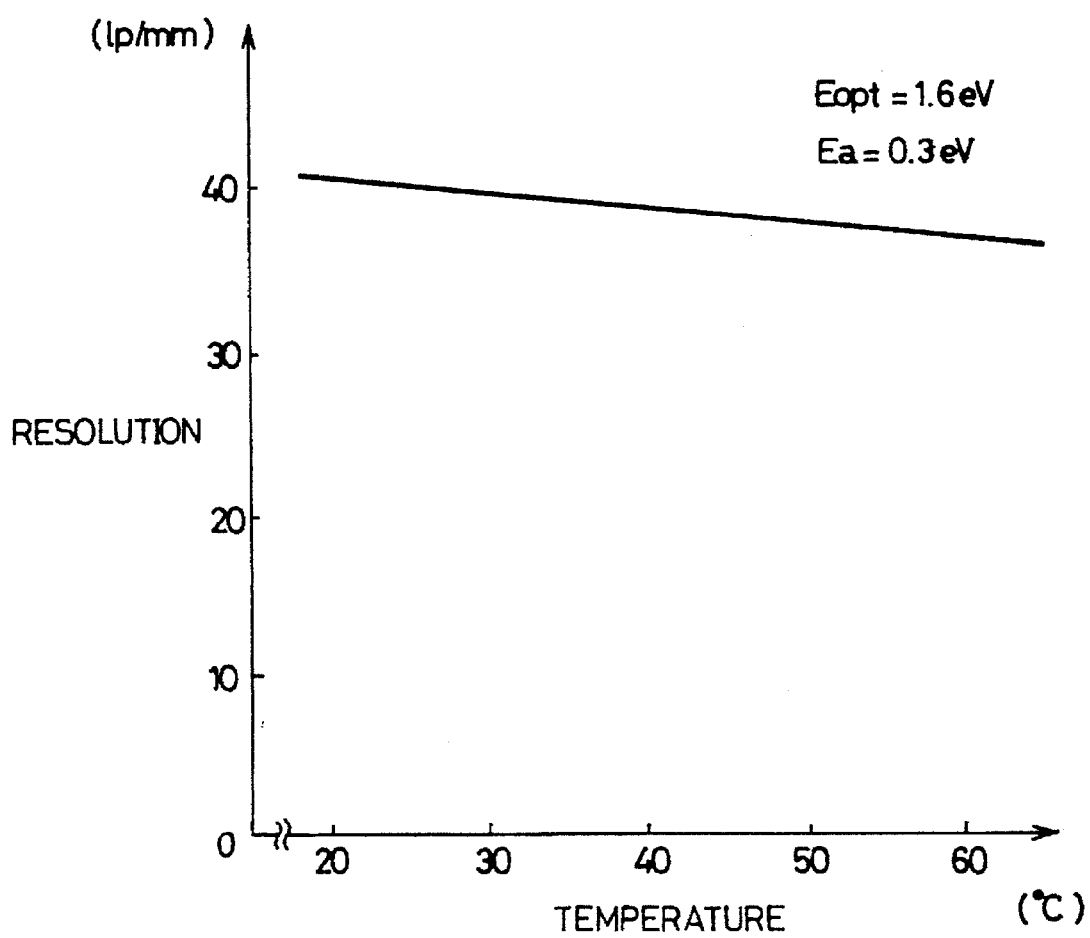
FIG. 5 is a graph which shows a relationship between a change in temperature and resolution of the liquid crystal light valve shown in FIG. 4.

The following will discuss another embodiment of the present invention referring to FIGS. 4 and 5.

As shown in FIG. 4, a liquid crystal light valve of the present embodiment has the basically same arrangement as that mentioned in embodiment 1. The liquid crystal light valve of the present embodiment is composed of a liquid crystal layer 47, a dielectric mirror 44, a light blocking layer 43 and a photoconductor layer 42, and it has a sandwich structure such that each layer is put between light transmitting substrates 40a.40b on which a transparent electrode 41a and a counter electrode 41b have been formed. The light transmitting substrate 40a is made of a fiber plate and the light transmitting substrate 40b is made of glass. Moreover, an anti-reflection coating 48 for preventing reflection of a reading light 50 is formed on a surface of the reading light 50 side of the light transmitting substrate 40b.

The liquid crystal layer 47 modulates intensity of the reading light 50 according to a change in voltage to be applied. The dielectric mirror 44 is composed of a dielectric multilayer film which reflects the reading light 50. The light blocking layer 43 is composed of hydrogenated amorphous silicon germanium which blocks a transmitted light from the dielectric mirror 44. The impedance of the photoconductor layer 42 changes according to intensity of the writing light 49 and is composed of hydrogenated amorphous silicon which controls a voltage to be applied to the liquid crystal layer 47.

In addition, an alignment film 45a which aligns liquid crystal molecules is formed on the dielectric mirror 44, whereas an alignment film 45b which aligns liquid crystal molecules is formed on the counter electrode 41b. The liquid crystal layer 47 is formed by sealing liquid crystal between the alignment films 45a.45b through spacers 46.46. Moreover, the transparent electrically conductive films 41a.41b are connected to a driving power source (not shown) which generates an alternating voltage.

Next, the following will discuss a method of producing the liquid crystal light valve.

First, a transparent electrically conductive film composed of tin oxide ($SnO_2$) which is wholly doped with tin is formed on the light transmitting substrate 40a composed of the fiber plate by sputtering method, and it becomes the transparent electrode 41a.

Next, a hydrogenated amorphous silicon carbide (a-SiC:H) film is formed as the photoconductor layer 42 on the transparent electrode 41a by plasma CVD method which uses silane ($SiH_4$) gas and methane ($CH_4$) gas as raw materials so that its thickness becomes approximately 5 μm.

Successively, hydrogenated amorphous silicon germanium (a-SiGe:H) is formed as the light blocking layer 43 for blocking a light, which enters the photoconductor layer 42 from the liquid crystal layer 47 side, on the photoconductor layer 42 by the plasma CVD method so that its thickness becomes approximately 0.8 μm.

The hydrogenated amorphous silicon germanium (a-SiGe:H) is created by using silane ($SiH_4$) gas, germane ($GeH_4$) gas and hydrogen ($H_2$) gas containing diborane ($B_2H_6$) gas of 100 ppm and krypton (Kr) gas as raw materials. Creating conditions at this time are as follows. A gas ratio, $SiH_4:GeH_4:H_2:Kr=3:1:5:5$, pressure is 0.7 Torr, temperature of the substrate is 280° C. and Rf power is 200 W. An optical gap Eopt of the light blocking layer 43 which has been created in such a manner becomes 1.6 eV, and its activation energy Ea becomes 0.3 eV.

Thereafter, on the light blocking layer 43, a multilayer film composed of titanium oxide ($TiO_2$) and silicon oxide ($SiO_2$) is formed as the dielectric mirror 44 for reflecting a light entering the photoconductor layer 42 from the liquid crystal layer 47 side by electron beam deposition method.

Next, the counter electrode 41b is formed on the light transmitting substrate 40b which is opposite to the light transmitting substrate 40a by depositing a transparent electrically conductive film composed of ITO by means of sputtering method on the liquid crystal layer 47 side, and the anti-reflection coating 48 for preventing reflection from a surface of glass is also formed on an incident side of the reading light 50.

Successively, an alignment film is filmed by spin coating and is baked at 180° C. so that the alignment films 45a.45b with a film thickness of approximately 500 Å are formed on the counter electrode 41b and the dielectric mirror 44.

Thereafter, the alignment films 45a.45b are subject to an alignment process by means of rubbing. A rubbing direction is twisted 45°. A sealant is printed on one substrate so that spacers 46.46 are formed, and the light transmitting substrate 40a and the light transmitting substrate 40b are stuck to each other through the spacers 46.46. In such a way, the liquid crystal light valve of the present embodiment is arranged.

Here, FIG. 5 shows a relationship between resolution and temperature of the liquid crystal light valve with the above arrangement. According to FIG. 5, in the same manner as embodiment 1, also in the liquid crystal light valve of the present embodiment, lowering of resolution due to a rise in temperature is not remarkable, so its brightness and its resolution are high. Moreover, light blocking properties of the light blocking layer 43 are satisfactorily maintained without a drop due to a rise in temperature.

In addition, since the light blocking layer 43 has small activation energy of 0.3 eV, a rate of a rise in conductivity due to a rise in temperature becomes low. For this reason, a rate of the lowering of resolution due to the change in temperature can be suppressed low.

Therefore, when the liquid crystal light valve with the above arrangement is applied to a projection system, etc. shown in FIG. 3, for example, it is possible to provide a projection system which can easily realize projected display with high brightness, high resolution and high contrast.

[EMBODIMENT 3]

Figure 6:
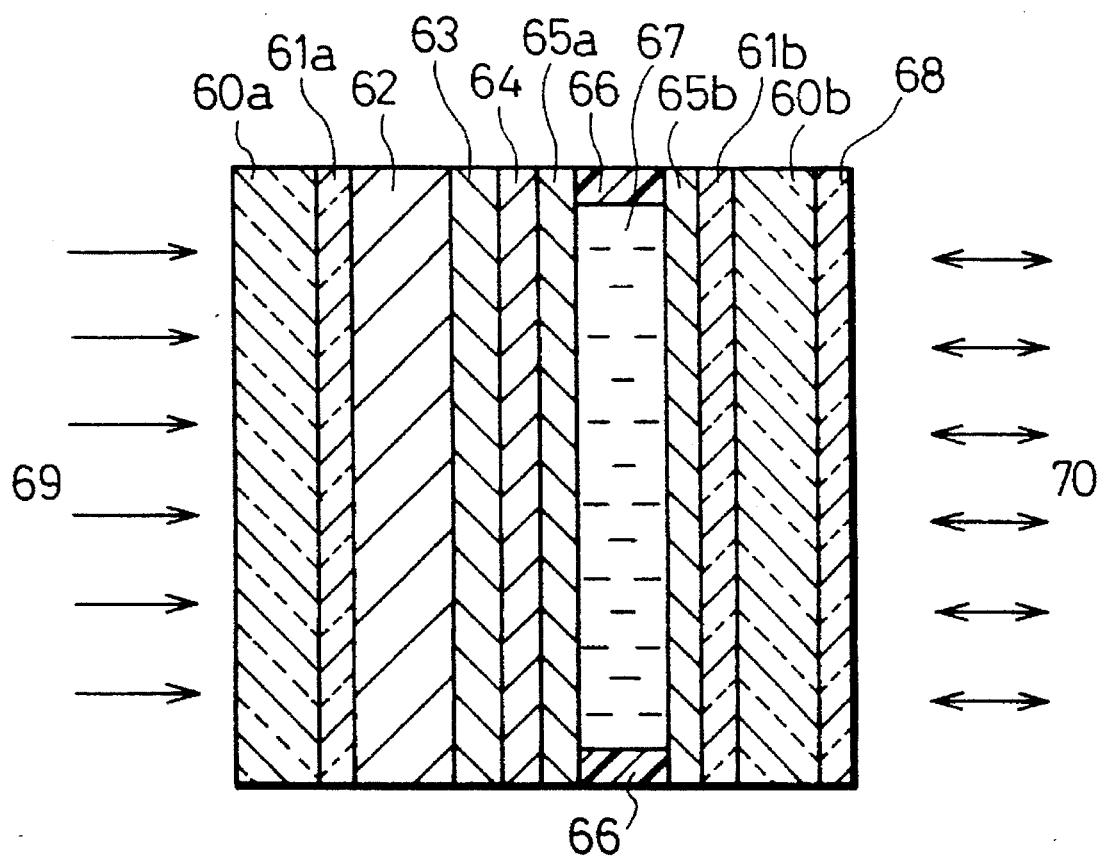
FIG. 6 is a schematically constitutional cross section of a liquid crystal light valve of still another embodiment according to the present invention.
Figure 7:
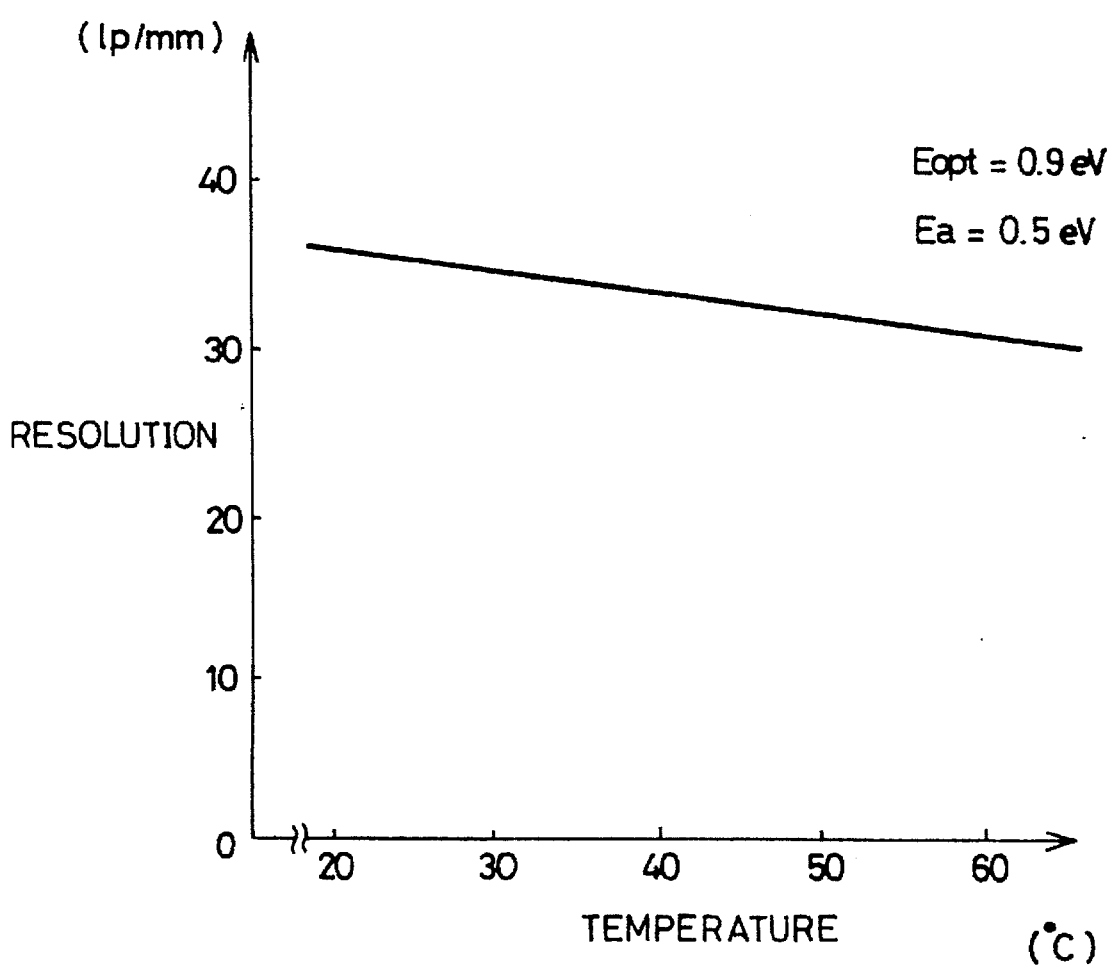
FIG. 7 is a graph which shows a relationship between a change in temperature and resolution of the liquid crystal light valve shown in FIG. 6.

The following will discuss still another embodiment of the present invention referring to FIGS. 6 and 7.

A liquid crystal light valve of the present embodiment has the basically same arrangement as of the liquid crystal light valve mentioned in embodiment 2. As shown in FIG. 6, the liquid crystal light valve of the present embodiment is arranged so as to have a light transmitting substrate 60a composed of a fiber plate, a light transmitting substrate 60b composed of glass, a transparent electrode 61a, a counter electrode 61b, a photoconductor layer 62, a light blocking layer 63, a dielectric mirror 64, alignment films 65a,65b, a spacer 66, a liquid crystal layer 67 and an anti-reflection coating 68.

Next, the following will discuss a method of producing the liquid crystal light valve.

First, a transparent electrically conductive film composed of indium oxide (ITO) and tin oxide (SnO$_2$) which is wholly doped with tin is formed on the light transmitting substrate 60a made of the fiber plate by sputtering method, and it becomes the transparent electrode 61a.

Next, a hydrogenated amorphous silicon germanium (a-SiGe:H) film is formed on the transparent electrode 61a as the photoconductor layer 62 which changes impedance according to intensity of a writing light 69 by using plasma CVD method which uses silane (SiH$_4$) gas, germane (GeH$_4$) gas and hydrogen (H$_2$) gas as raw materials so that its film thickness becomes approximately 8 μm. Creating conditions at this time are as follows. A gas ratio, SiH$_4$:GeH$_4$:H$_2$= 5:1:10, pressure is 0.75 Torr, temperature of the substrate is 270° C. and Rf power is 50 W.

Next, hydrogenated amorphous silicon tin (a-SiSn:H) is formed on the photoconductor layer 62 as the light blocking layer 63 for blocking a light entering the photoconductor layer 62 from the liquid crystal layer 67 side by the sputtering method so that its thickness becomes approximately 0.7 μm.

The hydrogenated amorphous silicon tin (a-SiSn:H) is created by using a SiSn (weight ratio-Si:Sn=1:1) target in an atmosphere of hydrogen (H$_2$) gas and xenon (Xe) gas. Creating conditions at this time are as follows. A gas ratio, H$_2$:Xe=1:1, pressure is 3 mTorr, temperature of the substrate is 250° C. and Rf power is 1000 W. An optical gap Eopt of the light blocking layer 63 which has been created in such a manner becomes 0.9 eV, and its activation energy Ea becomes 0.5 eV.

Thereafter, on the light blocking layer 63, a multilayer film composed of titanium oxide (TiO$_2$) and silicon oxide (SiOn) is formed as the dielectric mirror 64 for reflecting the light entering the photoconductor layer 62 from the liquid crystal layer 67 side by the electron beam deposition method.

Next, the counter electrode 61b is formed on the liquid crystal layer 67 side on the light transmitting substrate 60b which is opposite to the light transmitting substrate 60a by depositing a transparent electrically conductive film composed of ITO by means of the sputtering method, and the anti-reflection film 68 for preventing reflection from a surface of glass is formed on an incident side of the reading light 70.

Successively, an alignment film is filmed by spin coating and is baked at 180° C. so that the alignment films 65a,65b with a film thickness of approximately 500 Å are formed on the counter electrode 61b and the dielectric mirror 64.

Thereafter, the alignment films 65a,65b are subject to an alignment process by means of rubbing. A rubbing direction is twisted 45°. A sealant is printed on one substrate so that spacers 66,66 are formed, and the light transmitting substrate 60a and the light transmitting substrate 60b are stuck to each other through the spacers 66,66. In such a way, the liquid crystal light valve of the present embodiment is arranged.

Here, FIG. 7 shows a relationship between resolution and temperature of the liquid crystal light valve with the above arrangement. According to FIG. 7, in the same manner as embodiments 1 and 2, also in the liquid crystal light valve of the present embodiment, lowering of resolution due to a rise in temperature is not remarkable, so its brightness and its resolution are high. Moreover, light blocking properties of the light blocking layer 63 are satisfactorily maintained without a drop due to the rise in temperature.

Therefore, when the liquid crystal light valve with the above arrangement is applied to a projection system, etc. shown in FIG. 3, for example, it is possible to provide a projection system which can easily realize projected display with high brightness, high resolution and high contrast.

[EMBODIMENT 4]

Figure 8:
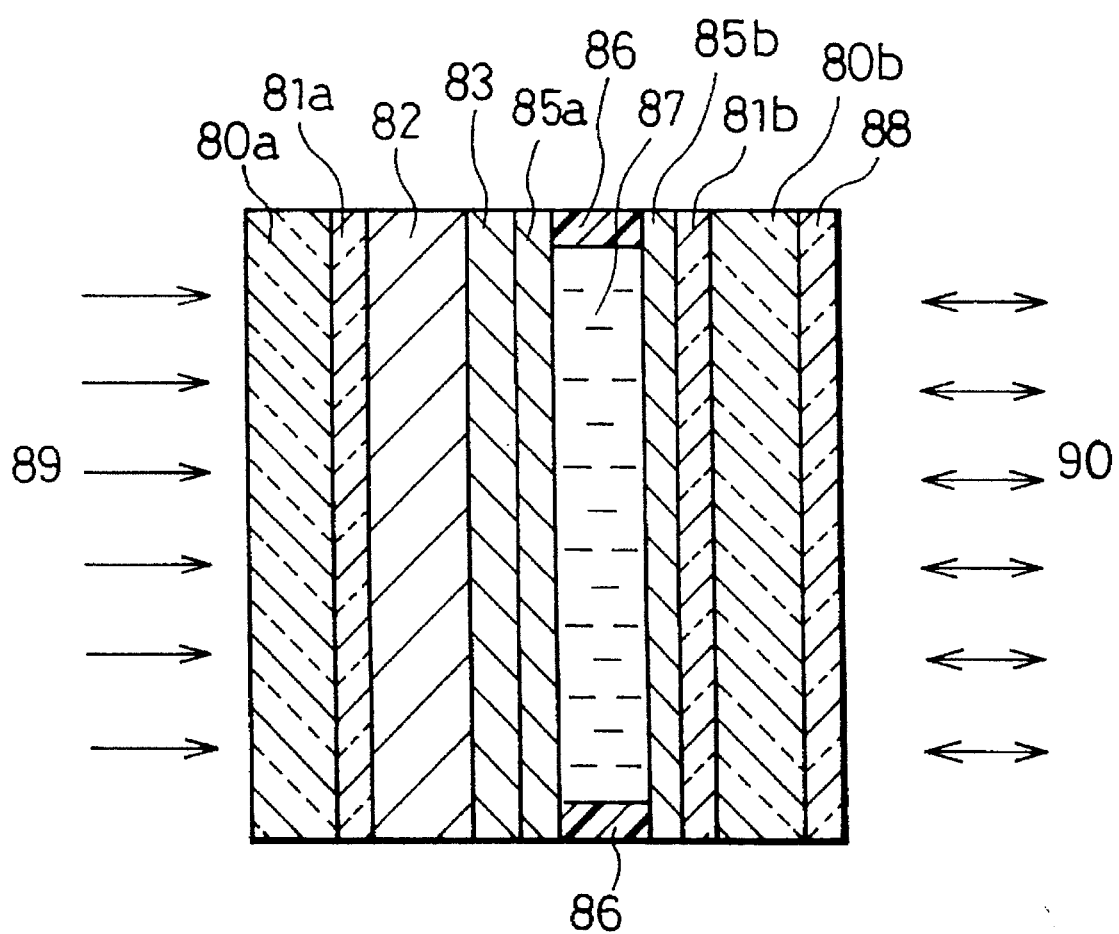
FIG. 8 is a schematically constitutional cross section of a liquid crystal light valve of still another embodiment according to the present invention.
Figure 9:
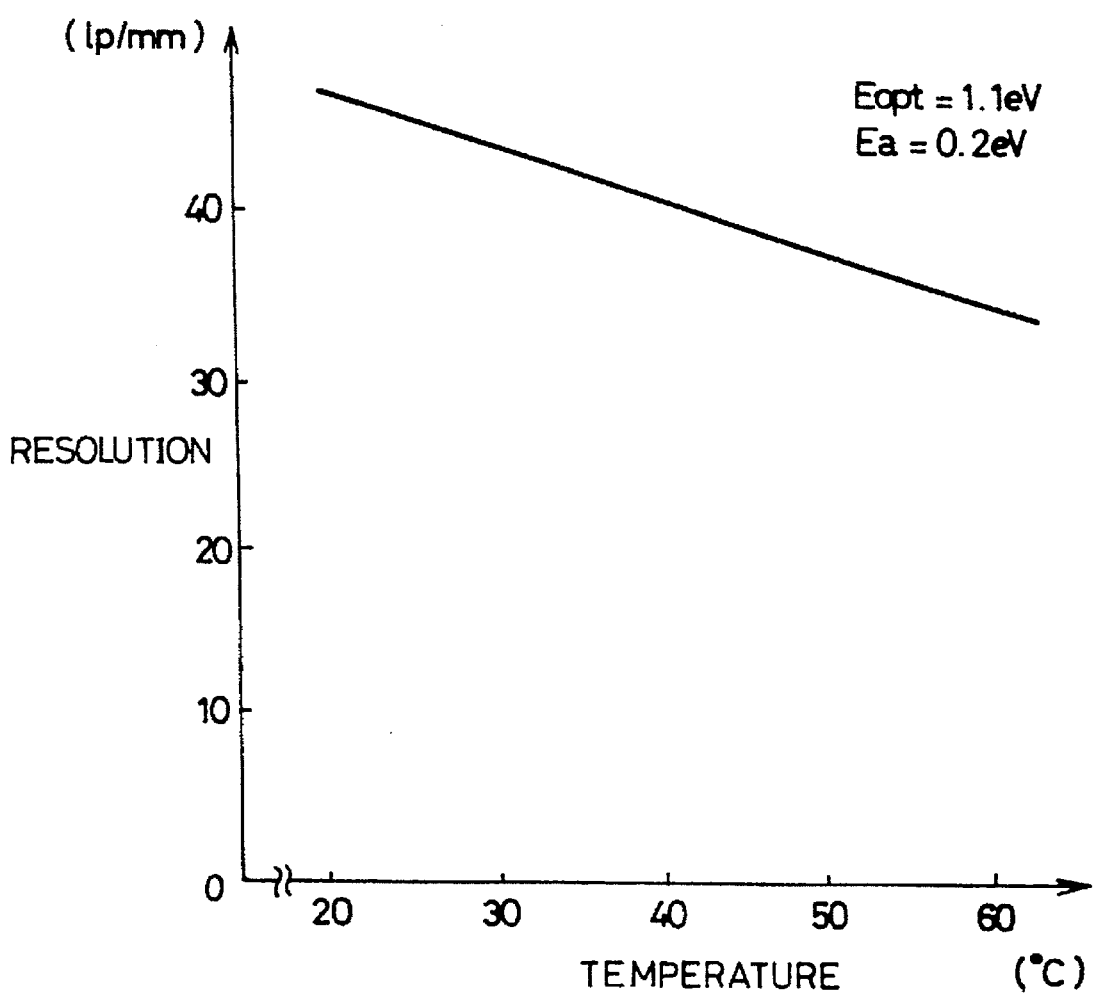
FIG. 9 is a graph which shows a relationship between a change in temperature and resolution of the liquid crystal light valve shown in FIG. 8.
Figure 10:
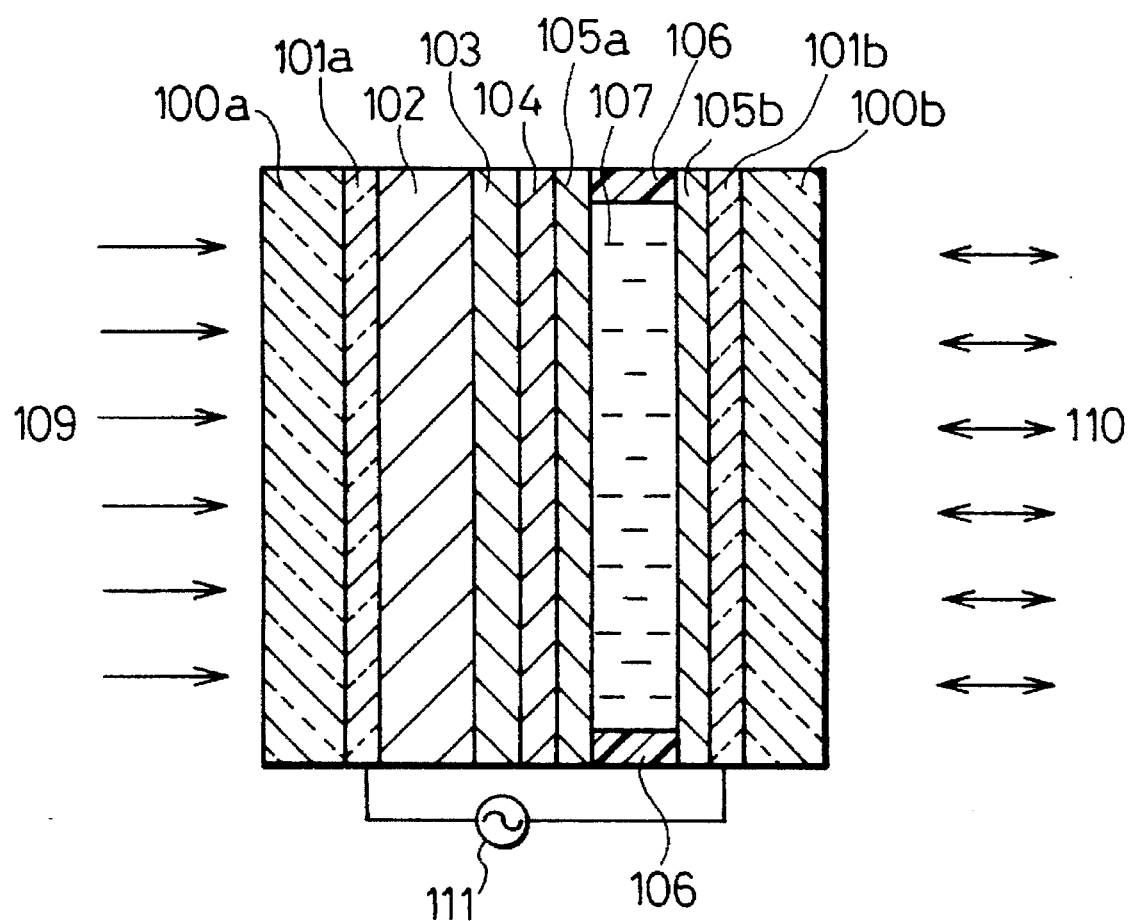
FIG. 10 is a schematically constitutional drawing of a conventional liquid crystal light valve.
Figure 11:
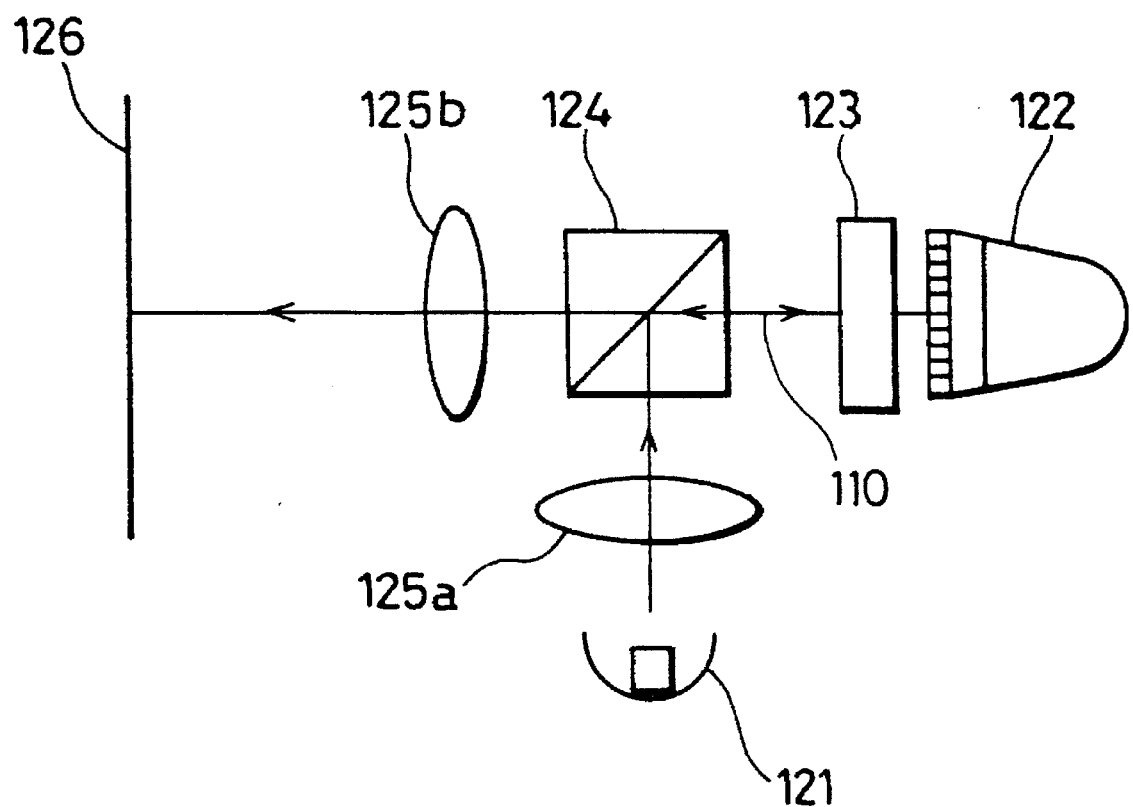
FIG. 11 is a schematically constitutional drawing of a projection system which uses the liquid crystal light valve shown in FIG. 10.

The following will discuss still another embodiment of the present invention referring to FIGS. 8 and 9.

A liquid crystal light valve of the present embodiment has the basically same arrangement as of the liquid crystal light valve mentioned in embodiment 1, and as shown in FIG. 8, the liquid crystal light valve of the present embodiment is composed of light transmitting substrates 80a,80b made of glass, a transparent electrode 81a and a counter electrode 81b, a photoconductor layer 82, a light blocking layer 83, alignment films 85a,85b, a spacer 86, a liquid crystal layer 87 and an anti-reflection coating 88.

Next, the following will discuss a method of producing the liquid crystal light valve.

First, a transparent electrically conductive film composed of tin oxide (SnO$_2$) which is wholly doped with tin is formed on the light transmitting substrate 80a by sputtering method, and it becomes the transparent electrode 81a.

Next, a hydrogenated amorphous silicon (a-Si:H) film is formed on the transparent electrode 81a as the photoconductor layer 82 for changing impedance according to intensity of a writing light 89 by using plasma CVD method which uses silane (SiH$_4$) gas as a raw material so that its film thickness becomes approximately 8 μm.

Successively, hydrogenated amorphous silicon tin (a-SiSn:H) is formed on the photoconductor layer 82 as the light blocking layer 83 for blocking a light entering the photoconductor layer 82 from the liquid crystal layer 87 side by the plasma CVD method so that its thickness becomes approximately 0.7 μm. Here, The light blocking layer 83 also serves as a reflection layer which reflects a reading light 90.

The hydrogenated amorphous silicon tin (a-SiSn:H) is created by using silane ($SiH_4$) gas, $Sn(CH_3)_4$ gas and Argon (Ar) gas containing diborane ($B_2H_6$) gas of 200 ppm as raw materials. Creating conditions at this time are as follows. A gas ratio, $SiH_4:Sn(CH_3)_4:Ar=3:1:5$, pressure is 0.65 Torr, temperature of the substrate is 280° C. and Rf power is 250 W. In the light blocking layer 83 which has been formed in such a manner, its optical gap Eopt is 1.1 eV and its activation energy Ea is 0.2 eV.

Next, the counter electrode 81b is formed on the liquid crystal layer 87 side on the light transmitting substrate 80b which is opposite to the light transmitting substrate 80a by depositing a transparent electrically conductive film composed of $SnO_2$ by means of sputtering method, and the anti-reflection coating 88 for preventing reflection from a surface of glass is also formed on an incident side of the reading light 90.

Successively, an alignment film is filmed by spin coating and is baked at 180° C. so that the alignment films 85a.85b with a film thickness of approximately 500 Å are formed on the light blocking layer 83 and the counter electrode 81b.

Thereafter, the alignment films 85a.85b are subject to an alignment process by means of rubbing. A rubbing direction is twisted 45°. A sealant is printed on one substrate so that spacers 86.86 are formed, and the light transmitting substrate 80a and the light transmitting substrate 80b are stuck to each other through the spacers 86.86. In such a way, the liquid crystal light valve of the present embodiment is arranged.

Here, FIG. 9 shows a relationship between resolution and temperature of the liquid crystal light valve with the above arrangement. According to FIG. 9, in the same manner as embodiments 1, 2 and 3, also in the liquid crystal light valve of the present embodiment, lowering of resolution due to a rise in temperature is not remarkable, so its brightness and its resolution are high. Moreover, light blocking properties of the light blocking layer 83 are satisfactorily maintained without the drop due to a rise in temperature.

In addition, since the light blocking layer 83 has small activation energy of 0.2 eV, a rate of a rise in conductivity due to a rise in temperature becomes small. For this reason, a rate of the lowering of resolution due to the change in temperature can be suppressed low.

Therefore, when the liquid crystal light valve with the above arrangement is applied to a projection system, etc. shown in FIG. 3, for example, it is possible to provide a projection system which can easily realize projected display with high brightness, high resolution and high contrast.

According to the above embodiments and various experiments by the inventor, it is found that in the liquid crystal light valve of the present invention, gentle temperature properties and high resistance can be obtained by forming the light blocking layer using 4B group alloy whose main ingredient is silicon so that a relationship between its activation energy Ea and its optical gap Eopt becomes $0<Ea<Eopt/2$ or $0<Ea\leq0.50$ eV.

As a result, it is possible to provide the light blocking layer in which a change in conductivity according to a change in temperature is small. Since accordingly, temperature properties to resistivity of the light blocking layer can be relieved, it is possible to provide a liquid crystal light valve having high brightness and high resolution without deteriorating light blocking properties.

Here, the present invention is variously applicable to other devices, such as the projection system, in a scope where effects of the present invention are not deteriorated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal light valve comprising:
   a pair of transparent substrates each having electrodes;
   a photoconductor layer and a light blocking layer which are formed on one of the electrodes of said transparent substrates; and
   liquid crystal which is sealed between said pair of transparent substrates,
   wherein said light blocking layer is composed of 4B group alloy containing silicon, said light blocking layer being formed (i) so that a relationship between its activation energy Ea and its optical gap Eopt is $0<Ea<Eopt/2$ or (ii) so that the activation energy Ea is $0<Ea<0.50$ eV.

2. The liquid crystal light valve as defined in claim 1, wherein said light blocking layer is composed of hydrogenated amorphous silicon germanium.

3. The liquid crystal light valve as defined in claim 1, wherein said light blocking layer is composed of hydrogenated amorphous silicon tin.

4. The liquid crystal light valve as defined in claim 1, wherein said light blocking layer, the relationship between the activation energy Ea and the optical gap Eopt is $0<Ea<Eopt/2$.

5. The liquid crystal light valve as defined in claim 1, wherein the value of the activation energy of the light blocking layer is limited to a range that is required for satisfying that the conductance σ of the light blocking layer is not more than $10^{-6}$ (S/cm).

6. The liquid crystal light valve as defined in claim 1, wherein the activation energy of the light blocking layer is not less than 0.2 eV.

7. A liquid crystal light valve comprising:
   a first light transmitting substrate on which a transparent electrode has been formed;
   a photoconductor layer formed on the transparent electrode;
   a light blocking layer formed on said photoconductor layer;
   a light reflecting layer composed of a dielectric multilayer film formed on said light blocking layer;
   a second light transmitting substrate made of glass, where a counter electrode has been formed on its one surface and an anti-reflection coating has been formed on the other surface;
   alignment films formed on said light reflecting layer and said counter electrode; and
   a liquid crystal layer which is formed by sealing liquid crystal in a gap which is formed by providing a spacer between said alignment films,
   wherein said light blocking layer is formed (i) so that a relationship between its activation energy Ea and its optical gap Eopt is $0<Ea<Eopt/2$ or (ii) so that the activation energy Ea is $0<Ea<0.50$ eV.

8. The liquid crystal light valve as defined in claim 7, wherein said light blocking layer is composed of hydrogenated amorphous silicon germanium.

9. The liquid crystal light valve as defined in claim 7, wherein said light blocking layer is composed of hydrogenated amorphous silicon tin.

10. The liquid crystal light valve as defined in claim 8, wherein:

said first light transmitting substrate is composed of glass, said photoconductor layer is composed of hydrogenated amorphous silicon.

11. The liquid crystal light valve as defined in claim 8, wherein:

said first light transmitting substrate is composed of a fiber plate, said photoconductor layer is composed of hydrogenated amorphous silicon carbide.

12. The liquid crystal light valve as defined in claim 9, wherein:

said first light transmitting substrate is composed of a fiber plate, said photoconductor layer is composed of hydrogenated amorphous silicon germanium.

13. A liquid crystal light valve comprising:

a first light transmitting substrate on which a transparent electrode has been formed;

a photoconductor layer formed on the transparent electrode;

a light blocking layer formed on said photoconductor layer;

a second light transmitting substrate composed of glass where a counter electrode has been formed on its one surface and an anti-reflection coating has been formed on the other surface;

alignment films formed on said light blocking layer and the counter electrode; and a liquid crystal layer which is formed by sealing liquid crystal in a gap formed by providing a spacer between said alignment films, wherein said light blocking layer is formed (i) so that a relationship between its activation energy Ea and its optical gap Eopt is $0<Ea<Eopt/2$ or (ii) so that the activation energy Ea is $0<Ea<0.50$ eV.

14. The liquid crystal light valve as defined in claim 13, wherein said light blocking layer is composed of hydrogenated amorphous silicon tin.

15. The liquid crystal light valve as defined in claim 14, wherein:

said first light transmitting substrate is composed of glass, said photoconductor layer is composed of hydrogenated amorphous silicon.

16. A projection-type liquid crystal display apparatus comprising:

a liquid crystal light valve for forming a read image by modulating a reading light according to image information written by irradiation of a writing light;

writing means for irradiating the writing light to said liquid crystal light valve;

reading means for irradiating the reading light to said liquid crystal light valve;

a screen on which the read image formed by said liquid crystal light valve is projected; and projecting means for projecting the read image on said screen, wherein the liquid crystal light valve includes:

a pair of transparent substrates each having electrodes;

a photoconductor layer and a light blocking layer which are formed on one of the electrodes of said transparent substrates; and liquid crystal which is sealed between said pair of transparent substrates, wherein said light blocking layer is composed of 4B group alloy containing silicon, said light blocking layer being formed (i) so that a relationship between its activation energy Ea and its optical gap Eopt is $0<Ea<Eopt/2$ or (ii) so that the activation energy Ea is $0<Ea<0.50$ eV.

17. The projection-type liquid crystal display apparatus as defined in claim 16, wherein said writing means includes a liquid crystal panel for generating an image and a light source for irradiating a light for converting the generated image to a writing light on the liquid crystal panel.

18. The projection-type liquid crystal display apparatus as defined in claim 17, wherein said writing means and said liquid crystal light valve are provided for each images of red, green and blue lights.

* * * * *